Inventor
CARROLL J. LUCIA
JOHN Z. DE LOREAN

Inventor
CARROLL J. LUCIA
JOHN Z. DE LOREAN
By Wilson, Redraw and Sadler
Attorney

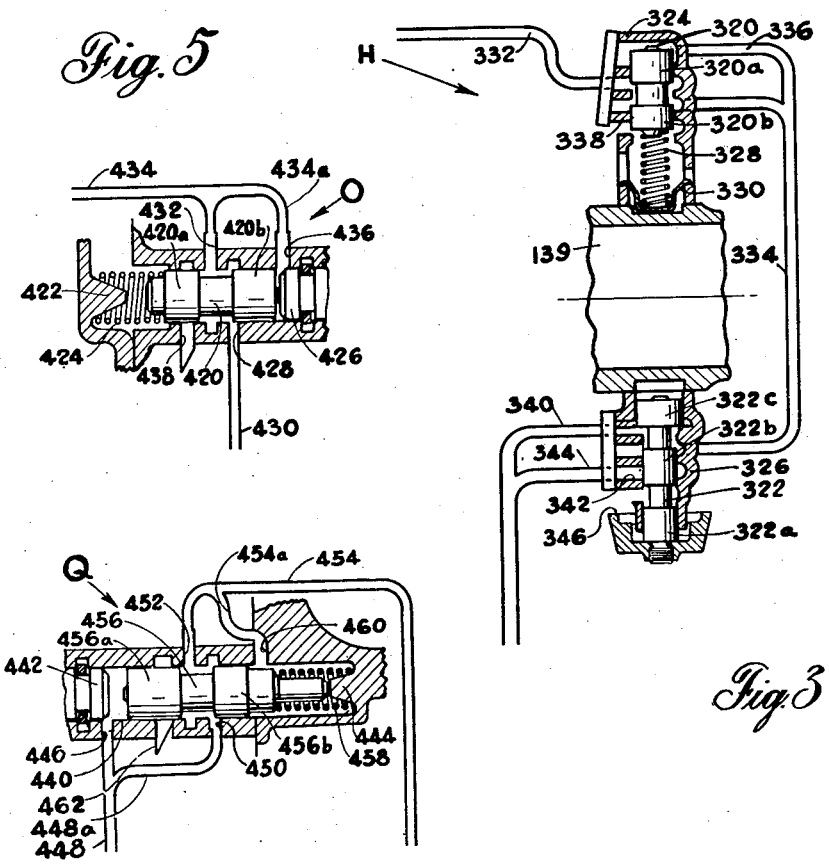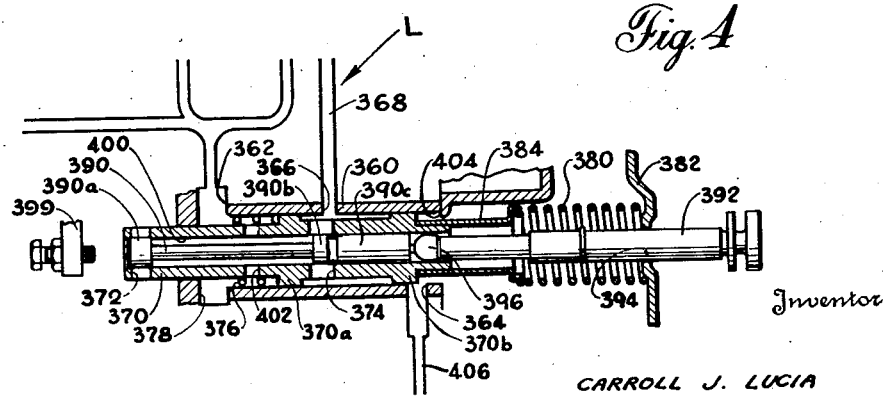

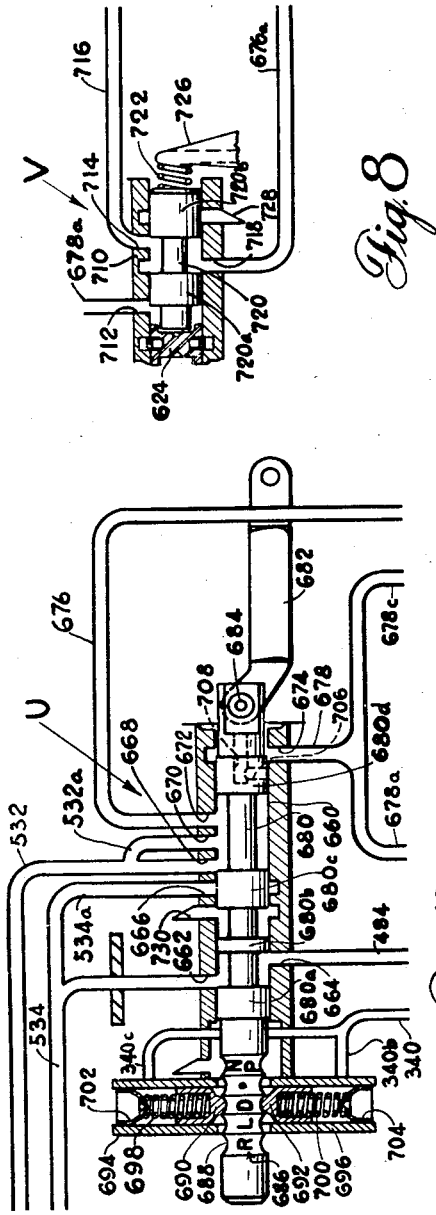

United States Patent Office 2,769,350
Patented Nov. 6, 1956

2,769,350

SHIFT REGULATOR VALVE

Carroll J. Lucia and John Z. De Lorean, Detroit, Mich., assignors to Studebaker-Packard Corporation, Detroit, Mich., a corporation of Michigan Application March 31, 1955, Serial No. 498,406

10 Claims. (Cl. 74—472)

This invention relates to a control valve for a hydraulic control system, and more particularly it relates to a pressure regulating valve in a hydraulic control system for a vehicle transmission which controls the pressure flow to a hydraulically operated transmission clutch.

In a hydraulic control system for a vehicle transmission having low and high driving ranges and hydraulically operated clutch means to engage one of the driving ranges, it is frequently a problem to obtain a smooth transition through the various driving ranges under different operating conditions. For example, under conditions of relatively low engine speed and high engine torque, when fluid pressure is delivered by the control system to effect the disengagement of the low range drive, a relatively high fluid pressure is required to operate the high range clutch to prevent it from slipping. However, if full pressure is admitted to the high range clutch, the latter is subjected to undue wear during an upshift when the low range drive is not fully disengaged. The high range clutch is also subjected to severe strain during a downshift when the pressure admitted to the high range clutch is not fully vented before the low range drive is engaged.

It is therefore an object of this invention to provide a shift regulator valve which serves a dual function; namely to momentarily retard the fluid pressure flow to the high range clutch during an upshift in order to allow sufficient time for the low range drive to be fully disengaged, and also to rapidly vent the high range clutch during downshift.

The applicant has devised a simplified and inexpensively manufactured valve which may be conveniently incorporated into a hydraulic transmission control system of the type described above, and it is described in the following pages in conjunction with a transmission control system similar to that described in a patent application filed in the names of Forest R. McFarland, Carroll J. Lucia and John Z. De Lorean, Serial No. 498,404, dated March 31, 1955.

For further understanding of the invention reference may be had to the accompanying drawings in which:

Figures 1 and 2 disclose a schematic view of a hydraulic control system for operating valve brakes and clutches for a vehicle transmission;

Figure 3 is an enlarged view in section of the governor regulator valve shown in Figure 2;

Figure 4 is an enlarged sectional view of the throttle valve shown in Figure 2;

Figure 5 is an enlarged sectional view of the throttle limit valve shown in Figure 2;

Figure 6 is an enlarged sectional view of the direct shift throttle valve shown in Figure 2;

Figure 7 is an enlarged sectional view of the manual selector valve shown in Figure 2;

Figure 8 is an enlarged sectional view of the reverse shuttle valve shown in Figure 2.

It is to be understood that the invention is not limited in its application to the details of construction and arrangement of parts illustrated in the accompanying drawings, since the invention is capable of other embodiments and of being practiced or carried out in various ways. Further, it is to be understood that the terminology employed herein is for the purpose of description and not of limitation.

Figure 1:
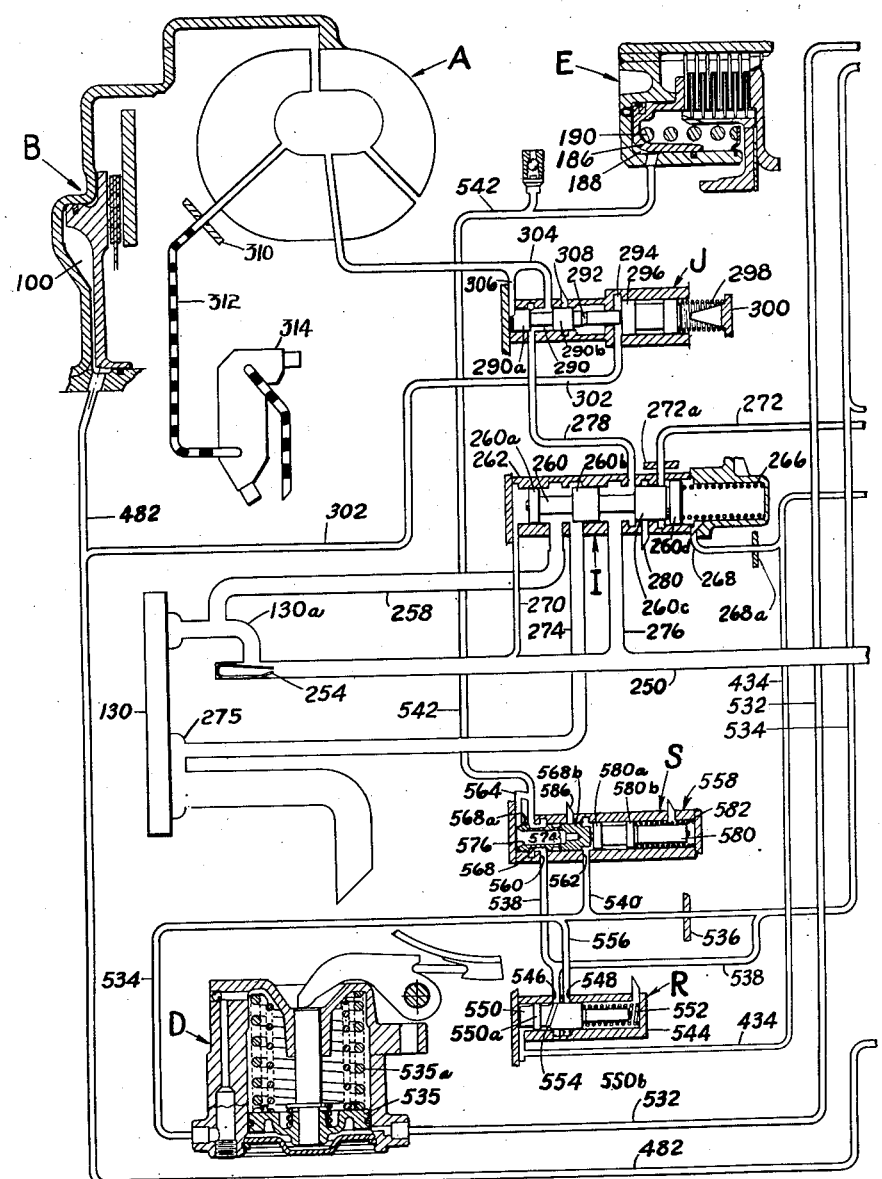
Figure 2:
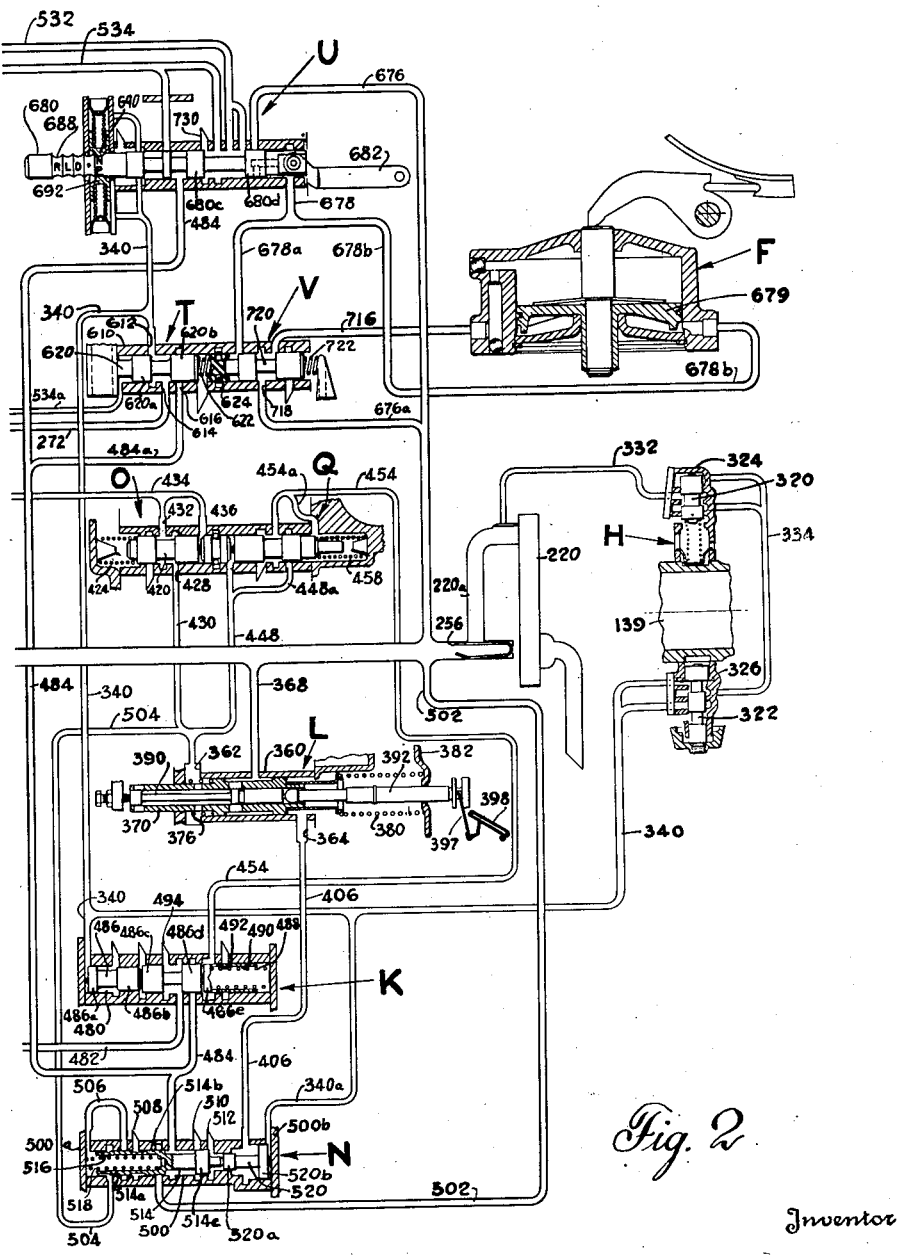

With reference to Figures 1 and 2 disclosing a diagrammatic view of the hydraulic control system which is similar to that disclosed in the above referred to McFarland, Lucia and De Lorean application, Serial No. 498,404, it will be seen that the front and rear pumps 130 and 220 respectively are connected by a fluid pressure gallery 250. The pumps draw fluid from a sump and circulate it through the hydraulically operated transmission controls, as well as the lubrication system of the transmission unit.

The front pump is drivingly connected with the engine drive shaft in the customary manner and is thus adapted to supply fluid under pressure to the gallery 250 whenever the vehicle engine is running. The rear pump 220 is driven by the output shaft of the engine in the conventional manner, and thus operates only when the output shaft is driven. Check valves 254 and 256 are disposed at opposite ends of the gallery adjacent the pump outlet conduits 130a and 220a connecting with the front and rear pumps respectively. The check valves 254 and 256 are arranged so that as the speed of the car is increased to approximately 5 to 8 miles per hour, the rear pump output increases sufficiently to open the rear pump check valve 256 to admit pressure to the gallery and thereby close the front pump check valve 254. When the front pump is operating, the front pump output pressure is delivered from its outlet to a pump regulator valve I, through the connecting conduit 258.

The pump regulator valve I includes a valve 260 which is reciprocally mounted within a housing 262. The valve 260 has four lands 260a, 260b, 260c, 260d; the first three all being of equal diameter but smaller than the diameter of land 260d. The valve 260 is urged to the left by a spring 266 retained between the right hand end of the valve and the adjacent housing wall. The action of spring 266 is supplemented by a torque responsive throttle limit valve pressure admitted to the right hand end of housing 262 through conduit 268, and which exerts a force against the right side of valve land 260d. Gallery fluid pressure is delivered through conduit 270 to the left hand end of the housing and urges the valve 260 to the right against the action of the spring 266 and the throttle limit pressure. In addition, the movement of valve 260 to the right is assisted by the modulating valve fluid pressure delivered to the housing through conduit 272, which exerts a force against the left side of land 260d. Restricted orifices 268a and 272a are connected in series with conduits 268 and 272, respectively, to minimize the effect of surging of the fluid pressure therein on the valve operation.

When the front pump is operating and the gallery pressure exceeds a predetermined limit, the valve 260 is moved a sufficient distance to the right so that land 260b uncovers conduit 274 connecting with the intake 275 of the front pump 130, and fluid pressure from the conduit 258 is permitted to flow therethrough back to the front pump.

Gallery fluid pressure is also delivered to the pump regulator valve I through conduit 276, and under normal operating conditions is permitted to flow between lands 260b and 260c into conduit 278 which connects with the converter valve J. In the event the rear pump 220 builds up excessive gallery pressures, valve 260 is moved to its extreme right-hand position, and as a result, land 260c uncovers vent line 280 connecting with the sump 252, and the gallery pressure from conduit 276 is vented therethrough.

From the above description it will be appreciated that the pump regulator valve I controls the pressure of the gallery fluid, and also determines which of the two pumps, independently or in combination, are to be operatively connected to the control system. In addition, if there is a large demand of fluid pressure while the rear pump 220 is operating, the regulator valve will operatively connect the front pump 130 with the system. Also, it will be seen that the applicants' regulator valve and gallery arrangement insures that sufficient pressure is first delivered to the gallery to operate the transmission clutches and brakes, before pressure is admitted to the converter valve J.

The converter valve J serves the dual function of maintaining the desired high fluid pressure in the converter A when the lock-up clutch B is inoperative and the converter is rendered operative, and a fixed percentage lower fluid pressure in the converter when the converter lock-up clutch B is engaged. The converter valve includes a valve 290 with two lands 290a and 290b of equal diameter, and an elongated valve stem 292 which extends into a separately enclosed fluid pressure chamber 294 housing valve 296. A spring 298 interposed between a spring stop member 300 and the right hand end of valve 296, tends to hold the left side of valve 296 in contact with the right hand end of valve 290. When the direct shift valve K is opened the pressure of the fluid in chamber 294 moves the valve 296 to the right, against the action of spring 298. Also, the fluid pressure from conduit 302 exerts a force against the end of the valve stem 292, thereby tending to move valve 290 to the left, but with less force than when the spring 398 forces the valve 296 against stem 292 of valve 290. When the direct shift valve K is closed and no fluid pressure is delivered through conduit 302, valve 296 bears against valve stem 292, and spring 298 moves both valves 296 and 290 to the left.

As valve 290 is moved to the left, land 290a uncovers conduit 278 connecting with the pump regulator valve I, and fluid pressure is admitted between lands 290a and 290b, through conduit 304 to the converter A, and thence through a restricted orifice 310 in the converter outlet conduit 312 connecting with a cooler 314, which in turn connects with the sump. The fluid pressure contained in line 304 is also conducted to the left hand end of the valve 290 through connecting conduit 306, which tends to move the valve 290 to the right against the action of spring 298, thereby effecting a reduction in the fluid pressure delivered to the converter as land 290a meters the flow through conduit 278.

When gallery pressure is delivered to chamber 294 through conduit 302, the force exerted thereby against the right end of valve stem 292, which is of smaller diameter than valve 296, permits valve 290 to move to the right so that land 290a meters a reduced pressure through conduit 278 to the converter A. By this arrangement a fixed percentage of lower fluid pressure is admitted to the converter for lubrication and cooling purposes when the latter is inoperative and the converter lock-up clutch is engaged. Therefore, it will be seen that in the applicants' control system arrangement, the operative converter lock-up clutch pressure and the converter pressure are self compensating in the event of pressure leakage in the lock-up clutch, when the latter is engaged. If the pressure delivered to the converter exceeds a predetermined limit, valve 290 is moved a sufficient distance to the right so that land 290a covers conduit 278 and land 290 uncovers vent line 308, with the result that the pressure in conduit 304 is vented to the sump. Thereafter, spring 298 and the gallery fluid pressure if any, returns valve 290 to its normal metering position.

It will be appreciated that the desired percentage differential in fluid pressure delivered to the converter when the latter is activated or rendered inoperative, may be obtained by varying the differentials in the diameters of the valve stem 292 and valve 296. In addition, the maximum fluid pressure delivered to the converter through the conduit 304 may be controlled by varying the tension of spring 298.

A speed responsive fluid pressure as determined by the speed of the output shaft 139 delivered by the governor valve H is utilized in conjunction with the torque responsive fluid pressure as determined by the position of the accelerator pedal delivered by the throttle valve L to operate the various controls in the hydraulic system, which in turn operate the transmission brakes and clutches, in a manner subsequently to be described.

With specific reference to Figure 3, it will be seen that the governor valve H includes a lightweight high speed valve 320 and a heavier weighted low speed valve 322 which are reciprocably mounted in valve chambers 324 and 326, respectively. The valve chambers 324 and 326 are fixedly mounted on output shaft 139, and the centrifugal force generated by their rotation tends to move the valves 320 and 322 away from and at right angles to the axis of the shaft. The centrifugal force acting upon the high speed valve 320 is supplemented by a spring 328 retained within the housing 324 between the under side of the valve and a spring stop member 330 which bears against the output shaft.

Fluid pressure from the outlet conduit 220a of the rear pump 220 is delivered to the high speed valve chamber 324 through conduit 332. The spring 328 normally positions the valve 320 so that land 320a uncovers conduit 332, and thus the rear pump pressure is permitted to flow out of the valve chamber through conduit 334 to the low speed governor valve chamber 326. Pressure from conduit 334 is also delivered to the upper end of the high speed valve chamber 324 through connecting conduit 336, and tends to move valve 320 inwardly against the action of the spring 328 and the centrifugal force, if any. As a result, the flow of fluid pressure from conduit 332 is metered by the relative movement of valve land 320a in respect thereto. If the pressure in conduit 334 exceeds a predetermined maximum limit for any driving speed, valve 320 is moved inwardly a sufficient distance by the fluid pressure at its outer end so that land 320a covers conduit 332 and land 320b uncovers vent port 338, whereupon, fluid pressure from line 334 flows through vent port 338 communicating with the sump.

It will be appreciated that the fluid pressure in conduit 334 at least must be equal to the force exerted by spring 328 before the high speed valve 320 commences to regulate the governor output pressure. It will also be appreciated that the relatively light weight high speed governor valve is adapted to provide a more sensitive pressure regulation at high vehicle speeds than would be possible using only a heavier weighted low speed valve, next to be described.

The low speed valve 322 has three lands; lands 322a and 322b, which are disposed near its outer end and center portion, respectively, being of equal but smaller diameter than land 322c disposed adjacent the output shaft 139. When the output shaft 139 is rotated, valve 322 is moved outwardly by centrifugal force and land 322b uncovers conduit 334 whereupon fluid pressure is permitted to flow between lands 322b and 322c to the governor outlet conduit 340. At the same time, the fluid pressure in chamber 326 tends to move valve 322 inwardly, due to the larger diameter of land 322c, and as a result, land 322b meters the pressure flow from conduit 334. It will be appreciated that the low speed valve 322 is adapted to provide a relatively steep increase in governor output pressure, due to its heavier weight and the differential area of lands 322b and 322c.

If the pressure in conduit 340 exceeds a predetermined limit, valve 322 is moved inwardly a sufficient distance so that land 322b covers conduit 334. Land 322b also uncovers a port 342 communicating with the outlet conduit 340 through connecting conduit 344. Thus, fluid pressure is permitted to flow through port 342 to a vent port 346 until the pressure in conduit 340 is sufficiently reduced and valve 322 is returned to its normal metering position.

With specific reference to Figure 4, it will be seen that the throttle valve L includes a cylindrical housing 360 with pressure outlet ports 362 and 364 near its opposite ends, and with a centrally disposed pressure inlet port 366 connected with gallery 250 by conduit 368. A sleeve shaped piston 370 having lands 370a and 370b of equal diameter formed near its center and right hand end, respectively, is reciprocably mounted within the housing 360. The piston 370 has a radial vent port 372 near its left hand end, and a radial pressure port 374 near its center. A throttle idle spring 376 disposed about the left end of piston 370, is loosely retained between the left side of land 370a and the adjacent housing end wall 378. It will be noted that spring 376 acts to move the piston 370 to the right, only when the piston is moved sufficiently to the left that spring 376 bears against the housing wall 378. The piston 370 is urged to the left by spring 380 disposed at its opposite end. The spring 380 is retained between the right hand housing end wall 382 and a cylindrically shaped spring retainer 384, which fits about the right end of piston 370 and abuts land 370b.

A valve 390 having lands 390a, 390b, and 390c, is slidably mounted within the piston 370, in axial alignment therewith. A plunger 392 is mounted for reciprocal movement through an opening 394 in the housing end wall 382 and extends through the cylindrical spring retainer 384. The left end of the plunger 392 is received within the piston 370 and is connected to the right end of valve 390 by a ball and socket coupling 396. The opposite end of the plunger 392 is connected by suitable linkage 397 to an engine accelerator pedal 398, as shown diagrammatically in Figure 2a. Thus, the position of the plunger 392 and valve 390 relative to the piston 370, is dependent upon the engine throttle setting. The leftward movement of the piston 370 and valve 390 towards the full closed throttle position is limited by an adjustable stop member 399.

When the plunger 392 and valve 390 are moved toward the full closed throttle position, spring 380 moves piston 370 sufficiently to the left so that the throttle idle spring 376 bears against the housing wall 378. As a result, piston 370 is positioned so that the right hand land 370b closes the outlet port 364 and, the left hand land 390a of valve 390 partially opens the piston vent port 372, and land 390b opens port 374. Under these conditions, the gallery pressure from conduit 368 is permitted to flow into a passageway 400 formed between piston 370 and valve 390. A portion of the fluid pressure in passageway 400 flows through vent port 372 to the sump, and the remainder flows through port 402 in the piston, and thence to the housing outlet port 362. The pressure delivered to the outlet port 362 exerts a force against the left side of land 370a urging the piston to the right, and port 374 is thereby partially closed by valve land 390b.

When the valve 390 is moved, a relatively small distance toward the open throttle position, spring 376 no longer bears against the housing wall 378, and thus the fluid pressure at the outlet port 362 alone acts to move the piston 370 to the right against the action of spring 380. As a result, a reduced pressure flow is metered through port 374. It will be appreciated that throttle valve outlet pressure remains approximately in direct proportion to the speed increasing position of the accelerator pedal, and is therefore substantially proportional to the torque output of the engine. In this connection, it will be seen that throttle idle spring 376 is utilized to position the piston 370 such as to provide a rapid increase in the throttle valve pressure as the engine throttle is initially opened and a corresponding rapid increase in engine torque is developed. A high throttle pressure is required under these operating conditions to ensure the positive engagement of the transmission brakes and clutches.

When the valve and plunger are moved beyond the full throttle setting to the kickdown position, valve land 390a closes vent port 372, and the full gallery pressure delivered to the outlet port 362, moves the piston 370 to its extreme right hand position against stop 404. As a result, land 370b uncovers outlet port 364, and gallery pressure flows therethrough, into conduit 406 connecting with the low-high shift valve N.

In the event the driver quickly removes his foot from the accelerator pedal and the valve 390 is moved rapidly to the left, valve land 390a is moved momentarily beyond the piston, uncovering vent port 372. Thus, spring 380, unopposed by the gallery fluid pressure, rapidly returns piston 370 towards the closed throttle position.

The throttle limit valve O as shown in Figure 5, includes a valve 420 with lands 420a and 420b disposed near its opposite ends, which is mounted for reciprocal movement within a cylindrical housing 422. A spring 424 retained between the left hand end of the valve 420 and the adjacent housing end wall, tends to move the valve to the right, towards a valve stop member 426. When valve 420 bears against stop 426, an inlet port 428 communicating with a throttle valve pressure conduit 430 is uncovered by the right hand land 420b. The throttle valve pressure is then permitted to flow around the valve to an outlet port 432 which is connected with the low regulator valve R by conduit 434. Also, as previously described, fluid pressure is delivered to the right hand end of the pump regulator valve J, through connecting conduit 268. In addition, pressure from conduit 434 is delivered by branch conduit 434a to a port 436 at the right hand end of housing 422, which urges valve 420 to the left against the action of spring 424 and land 420b thereby meters the pressure flow through the action of spring 424 and grooved portion of valve 420 thereby meters the pressure flow through the inlet port 428.

It will be appreciated that the maximum pressure which is permitted to flow through the throttle limit valve O cannot exceed the force exerted by spring 424, and the maximum outlet pressure may be determined by varying the tension of the spring. In the event of a sudden surge of pressure in conduit 434 and branch conduit 434a, valve 420 is moved to the left a sufficient distance so that its left hand land 420a uncovers vent port 438 connecting with the sump, and the right hand land 420b covers inlet port 428. When the excessive fluid pressure in line 434 has been vented through port 438, spring 424 returns valve 420 to its normal metering position.

The direct shift throttle valve Q, as shown in Figure 6, includes a cylindrical chamber or housing 440 with valve stop members 442 and 444 disposed at opposite ends thereof. The housing 440 has a radially extending pressure inlet port 446 formed at its left hand end connecting with a throttle valve pressure conduit 448 which in turn connects with the throttle valve outlet port 362. Another radial inlet pressure port 450 is disposed in the side of the valve housing near its center which is connected by branch line 448a with conduit 448. An outlet pressure port 452 also formed in the side of the valve housing near its center, connects with conduit 454 communicating with the direct shift valve K.

A valve 456 having land 456a and 456b formed in its left hand end and near its center, respectively, is reciprocably mounted within the chamber 440. A spring 458 retained between the right hand end of the valve 456 and the adjacent housing end wall, urges the valve 456 towards the stop member 442.

As the throttle pressure enters the valve chamber through inlet port 446, the valve 456 is moved to the right against the force exerted by the spring 458, and land 456b uncovers inlet port 450 and thus throttle pressure is permitted to flow between the valve lands, through the outlet port 452 and into conduit 454. The fluid pressure in conduit 454 is delivered to the right side of land 456b by a branch conduit 454a connecting with a radial port 460 near the right end of the housing. The pressure in conduit 454 and 454a, therefore, assists spring 458 to move the valve 456 to the left, and land 456b meters the pressure flow through inlet port 450. If a surge of pressure occurs in line 454 the valve is moved momentarily to the left against stop 442, and land 456b closes the inlet port 450 and land 456a uncovers vent port 462. The excess pressure in line 454 is then vented through the vent port 462 to the sump until the valve is returned to its normal metering position.

From the above description, it will be apparent that the purpose of the direct shift throttle valve Q is to deliver a pressure which is a predetermined fixed amount less than the throttle valve pressure and this differential in pressure is determined by the tension of spring 458. If for example, spring 458 has an applied force equivalent to 35 pounds per square inch, the throttle valve pressure delivered through conduit 448 must equal approximately 35 pounds per square inch before the valve is opened and fluid pressure is permitted to flow into conduit 454. Thereafter, the pressure in conduit 454 remains approximately 35 lbs. less than the throttle valve pressure as the latter is increased.

As will be seen in Figures 2 and 2a, conduit 454 from the direct shift throttle valve Q, communicates with the right hand portion of a cylindrical housing 480 of the direct shift valve K. The governor pressure conduit 340 connects with the left hand end of the housing 480, and conduits 482 and 484 communicate with the interior of its center portion. Conduit 482 is connected with the converter lock-up clutch B, and conduit 484 connects with both the manual selector valve U and the low-high shift valve N.

A valve 486 is mounted for reciprocal movement within housing 480 and is normally held in engagement with the left hand housing end wall by a spring 488 retained between the right hand end of the valve 486 and the adjacent housing end wall. The valve has five lands; lands 486a and 486b near its left hand end being of equal diameter, and lands 486c, 486d, 486e near its center and right hand end, respectively, being of equal diameter and larger diameter than lands 486a and 486b. For the reasons of economy and convenience of manufacturing, the valve 486 may be formed by two or more separate valves disposed in axial alignment.

When the engine is idling, spring 488 is assisted in moving valve 486 to the left by the direct shift throttle pressure from conduit 454 (a fixed amount less than the throttle pressure with a minimum of 35 p. s. i.). The direct shift throttle pressure is admitted into the interior of an axial bore 490 in the right end of the valve through a connecting radial bore 492, and reacts against the right side of valve land 486e. With the valve in its left hand position, land 486d covers conduit 484 communicating with the low-high shift valve N, and conduit 482 connecting with the converter lock-up clutch B is vented to the sump through vent port 494 which is uncovered by land 486c. When the governor pressure has increased sufficiently to move valve 486 to its right hand position within housing 480, land 486c covers vent port 494 and land 486d uncovers conduit 484. Thus, the low-high shift valve pressure from conduit 484 is permitted to flow between lands 486c and 486d to conduit 482, and thence into pressure chamber 100 in the converter lock-up clutch B. In addition, pressure from conduit 482 flows through branch line 302 to the converter valve J, which as previously explained meters a reduced pressure flow to the converter A while the lock-up clutch B is engaged.

When the vehicle speed is decreased, and the governor pressure is correspondingly decreased, the throttle pressure and spring 488 move the valve 486 to its left hand position, and the pressure in the lock-up clutch conduit 482 is vented to the sump. From the above description it will be apparent, that the direct shift valve K serves to control the engagement of the converter lock-up clutch B when the vehicle has attained a predetermined driving speed.

The following paragraphs include a description of the low high shift valve N, the low regulator valve R, the shift regulator valve S and the modulating valve T, and a detailed explanation of their interrelated operation.

The low high shift valve N includes a cylindrical housing 500 the right hand end of which connects with a branch conduit 340a of the governor pressure conduit 340. The kick-down throttle valve pressure conduit 406 connects with housing 500 near its right hand end, the direct shift valve conduit 484 and a conduit 502 communicating with the gallery 250 are both connected with the middle portion of the housing. Also, a conduit 504 is connected near its left hand end, which communicates with the outlet port 362 of the throttle valve L. A by-pass line 506 connects with the left hand end and center portion of the housing interior on opposite sides of conduit 504. In addition, the housing 500 has a radial vent port 508 near its center, and vent ports 510 and 512 disposed near its right hand end between conduits 484 and 406.

A piston 514 having an axial bore 516 in its left hand end, is reciprocally mounted within the left hand end of the housing 500. The piston 514 has lands 514a, 514b and 514c at its left end, center and right end, respectively; lands 514a and 514b being of equal and slightly larger diameter than land 514c. A spring 518 seated within the piston bore 516 and retained against the left hand housing end wall 500a, urges the piston 514 to the right.

A valve 520 is reciprocably mounted in the right hand end of the housing 500, and is disposed in axial alignment with piston 514. The valve 520 has a land 520a at its left hand end and a land 520b of larger diameter at its right hand end. Governor pressure delivered to the right end of the housing 500 exerts a force against the right side of land 520b, thereby moving valve 520 to the left, into engagement with the right end of piston 514.

As shown in Figures 2 and 2a, when the engine is idling and the manual selector valve U is placed in its neutral position, the piston 514 and valve 520 are moved by spring 518 to the right against the right hand housing end wall 500b. Under these conditions, piston land 514a uncovers throttle pressure conduit 504 and covers the right end of the by-pass conduit 506. The throttle pressure from conduit 504 upon being admitted to bore 516, assists the spring 518 in maintaining the piston in its right hand position so that land 514b covers the gallery pressure conduit 502, and vent ports 508, 510 and 512 are opened. As a result, no pressure can flow through conduit 484 to the direct shift valve K and the manual selector valve U, and for reasons that will subsequently be described, neither the low brake D or the high clutch E are engaged.

When the vehicle commences to move, and the governor pressure in branch conduit 340a is proportionally increased, the valve 520 and piston 514 are at first slowly moved toward the left. Thus, piston land 514b partially uncovers conduit 502, and fluid pressure is permitted to flow between lands 514b and 514c into conduit 484. It will be apparent that a metering action momentarily occurs between land 514b and conduit 502 when a balance is attained between the governor pressure at the right side, and the spring and and throttle pressure on the left side, of the valve. It will also be noted that when the low high shift valve N closes gallery conduit 502, no pressure can flow to the converter lock-up clutch B through conduit 482 regardless of the position of the direct shift valve K. A more complete description of the combined operation of the direct shift and the low-high shift valves will subsequently be given.

As the governor pressure increases, the piston 514 is moved further to the left, and land 514a covers the throttle pressure conduit 504, and the fluid pressure in bore 516 is vented through by-pass line 506 to vent port 508 connecting with the sump. As a result, the piston is moved rapidly to its extreme left hand position against the left hand housing end wall 500a since spring 518, alone, opposes its movement in this direction. Full gallery pressure is then permitted to flow through conduit 484, and the high range clutch E is engaged depending upon the position of the manual selector valve, which will subsequently be described in detail. In this connection, the governor pressure is assisted in holding the piston 514 in its extreme left hand position, by the force of the gallery pressure reacting against the right side of land 514b; the latter being of larger diameter than land 514c.

In the event the kick down throttle pressure is admitted to conduit 406 by the throttle valve L (when the accelerator pedal is depressed beyond its full throttle position), this pressure reacts against the left side of land 520b of valve 520, and the latter is moved to the right, if the governor pressure does not then exceed a predetermined limit. Consequently, the spring 518, then being unopposed by the governor pressure, moves the piston 516 rapidly to the right. The gallery pressure conduit 502 is then covered by land 514b, and no fluid pressure can flow through conduit 484 to the direct shift valve K. Therefore, regardless of the position of the latter, no pressure can be delivered through conduit 482 to engage the converter lock-up clutch B and consequently the converter A is activated. Also, since no pressure is delivered through conduit 484 to the manual selector valve U (and thence to the high range clutch and the release side of the low range brake D), the high range clutch may be inactivated and the low range brake engaged depending upon the position of the manual selector valve. A detailed description of the kickdown operation will be given following the description of the manual selector valve and its interrelated operation.

When the vehicle speed decreases, and a corresponding lower governor pressure is delivered to the right side of the valve, the piston 514 is at first moved slowly to the right by the action of the spring 518, thereby reducing the pressure flow to conduit 484. As the governor pressure decreases further, the piston is moved sufficiently towards the right that land 514a uncovers the throttle pressure conduit. Fluid pressure is then admitted to the piston bore 516 and the piston is rapidly moved thereby, to its extreme right-hand position, in engagement with the right hand housing end wall 500b.

It will be apparent upon reading the subsequent paragraphs, the lag preceding a positive, rapid movement of the piston 514, ensures that the operative transmission brake or clutch is released before the other is engaged.

The fluid pressure admitted to conduit 484 by the low-high shift valve N is conducted to the manual shift valve U. From there it flows through conduit 534 to the upper side of piston 535 in the low range brake D to effect its release. A restricted orifice 536 is connected in series with conduit 534 and serves to retard the fluid pressure flow to the release side of the low range brake D, for reasons subsequently to be described. The fluid pressure in conduit 534 is also conducted to the low regulator valve R and the shift regulator valve S, by branch conduits 538 and 540, respectively. Pressure flows from the shift regulator valve S through conduit 542 to the piston chamber 188 in the high range clutch E, thereby effecting the engagement of the high range planetary gear system.

The low regulator valve R has a cylindrical shaped housing 544 with two closely spaced radial ports 546 and 548 in its side. A valve 550 having lands 550a and 550b near its left hand end and center portion, respectively, is reciprocably mounted within the housing. The valve 550 is urged to the left by a spring 552, which is loosely disposed about its right hand end and retained between the right side of land 550b and the right hand housing end wall. Throttle limit valve pressure is delivered by conduit 434 to the left hand end of housing 544, and exerts a force against the left side of land 550a, thereby tending to move the valve to the right against the action of spring 552.

A fluid passageway 554 extends through the middle portion of valve 550 at an oblique angle to its longitudinal axis. When the valve is moved to the right into engagement with right end of the housing 544, the opposite ends of passageway 554 communicate with ports 546 and 548, respectively. The tension of spring 552 is such that when the pressure delivered to the left hand end of valve 550 is approximately 10% of the maximum throttle limit pressure, the valve is moved to its right hand position. Under these conditions, the fluid pressure in conduit 534 may by-pass orifice 536, by flowing through branch conduit 538 and valve passageway 554 to port 548, and thence through conduit 556 which connects with conduit 534 at a point between the low range brake D and the orifice 536.

Thus, it will be apparent that above 10% of the maximum throttle limit pressure, orifice 536 is by-passed, and the full pressure in conduit 534 is utilized to effect the rapid engagement or release of the low range brake D. When less than 10% of the maximum throttle limit pressure is developed, the low regulator valve R is closed and the pressure flow through conduit 534 is retarded by orifice 536, and consequently, the engagement or release of the low range brake D is momentarily delayed. It will be appreciated that under conditions of low throttle pressure, and a corresponding low engine torque, the slower release of the low brake will result in a smooth transition from the low to the high range through the planetary gear system. At higher engine torque, however, a similar delay in the release of the low brake, would result in the premature failure of the high range clutch.

As shown in Figure 2, the shift regulator valve S includes a cylindrical housing 558 having radially disposed pressure inlet ports 560 and 562 near its center which connect with the by-pass lines 538 and branch conduit 540, respectively. The high clutch pressure conduit 542 is connected near the left hand end of the housing 558, and a branch conduit 564 connecting therewith, delivers fluid pressure to the left end of the housing interior. It will be noted that the pressure supplied through branch conduit 540 is momentarily of lower pressure than that delivered through conduit 538, because the latter by-passes the restricted orifice 536.

A piston 568 having lands 568a and 568b near its opposite ends is reciprocably mounted within the left hand end of housing 558. The piston 568 has radial ports 574 in its side which communicate with an axial bore 576 extending inwardly from the left end of the piston. A valve 580 with lands 580a and 580b near its left end and center portion, respectively, is reciprocably mounted in the right end of the housing 558 in axial alignment with the piston. A spring 582 is loosely disposed about the right end of valve 580 and is retained between the left side of land 580b and the adjacent housing end wall. The spring 582 urges the valve and piston 568 towards the left end of the housing.

When the piston is in its left hand position, pressure from the by-pass conduit 538 flows freely around the valve (between lands 568a and 568b) into conduit 542. At the same time, the outlet pressure in conduit 542 is delivered to the left side of piston land 568a by branch conduit 564, and the piston thereby is moved slowly towards the right, first against the action of spring 582, and thereafter against the opposing force exerted by the pressure admitted through conduit 540. As the piston is moved to the right, fluid pressure from conduit 542 fills bore 576. The entire end surface of piston 568 is then exposed to the force of the fluid pressure, and therefore, the piston 568 is moved further to the right so that land 568a partially covers conduit 542, reducing the pressure flow in conduits 542 and 564 until a balance is substantially attained between the latter and the spring 582.

The fluid pressure delivered to the regulator valve S through conduit 540 initially has no effect on the position of piston 568 because of the action of the spring 582. When this pressure increases to a point where it exerts a greater force against the piston and valve than spring 582, valve 580 is moved thereby to the right against the housing wall. Also, the pressure from conduit 540 reacts against the right side of piston 568, moving the latter to the left until a balance is reached with the increased regulator valve outlet pressure in conduits 542 and 564. If, in the event, the pressure in conduit 542 decreases due to a leak in the high range clutch E, for example, the piston 568 is moved to the left, thereby permitting full gallery pressure from conduit 538, to flow between lands 568a and 568b.

From the above description it will be seen that the shift regulator valve S controls the pressure flow to the high range clutch E and assists in maintaining a predetermined high pressure in conduit 542 while the clutch E is engaged. During a shift from the low to the high range through the planetary system, for example the regulator valve S first acts to admit an increasing gallery pressure into conduit 542 (as the pump output increases), then momentarily the pressure increase is retarded (even though the vehicle speed and gallery pressure are increasing), and thereafter the pressure in conduit 542 is permitted to increase until it reaches the maximum gallery pressure. This delay in the rate of pressure increase in conduit 542 allows sufficient time for the low range brake D to be fully released before the high range clutch E is engaged.

During a downshift, pressure in conduits 540 and 534 is vented through vent port 510 in the low high shift valve N. As the piston 568 is moved to the right the radial piston ports 574 are aligned with a vent port 586, and the pressure in conduit 542 and piston bore 576 is abruptly vented therethrough. When the pressure in conduit 542 is reduced to a point where it produces a force approximately equal to that of spring 582, the piston is moved to the left by the spring, and the remainder of the pressure in conduit 542 flows through conduits 538, 534, and 484 to vent port 510 in the low high shift valve N. The rapid venting action of the shift regulator valve S during a down-shift, ensures that the high range clutch E is fully released before the low brake D is engaged, thereby providing a smooth transition between the planetary gear ranges and preventing the early failure of the high range clutch.

As shown in Figure 2a, the modulating valve T has a housing 610 with an inlet port 612 connected with the governor pressure conduit 340. The housing also has radial ports 614 and 616 in its side connecting with the pump valve conduit 272 and a branch conduit 484a of the low-high shift valve conduit 484, respectively. The left hand end of the housing is connected with conduit 534 through a branch conduit 534a.

A valve 620 having lands 620a and 620b near its opposite ends, is reciprocably mounted within the housing 610, and is normally urged against the left hand end thereof by a spring 622. The spring 622 is retained between the right end of the valve and a stop member 624 which is fixedly mounted at the right end of the housing. When the valve is moved to the left, land 620a opens port 612 and land 620b closes port 616. Fluid pressure is then permitted to flow from the governor pressure conduit 340 around the valve, and into conduit 272 connecting with the pump regulator valve I. As previously explained, under these conditions, the pump regulator valve I acts to reduce the gallery pressure in accordance with the speed of the vehicle.

When the low-high shift valve N admits fluid pressure to conduits 484, 534 and 542 to activate the high range clutch E, pressure from line 534a exerts a force against the left side of the modulating valve, and the latter is urged towards the right against the action of spring 622. Land 620a then covers the inlet port 612, and land 620b opens port 616, whereupon pressure flows from conduit 484a to conduit 272. As previously described, the pressure delivered through conduit 272 assists in moving the pump regulator valve 260 to the right and the front pump pressure thereby is reduced. If the high range clutch E is operative and the pressure in conduit 484a is below a predetermined limit the proportionately reduced pressure admitted to conduit 272 is not sufficient to move the pump regulator valve 260 to the right. Thus, the gallery pressure is permitted to increase, thereby ensuring the high range clutch E of adequate pressure to remain fully engaged. It will be noted that this latter condition (of relatively low pressure in conduit 484) is most likely to occur when the engine torque is high and vehicle speed is low, as for example, when starting in high range converter, and it is under these circumstances, that maximum gallery pressure is required to prevent the high range clutch from slipping.

It will be appreciated that another outstanding feature of the applicants' pump regulator valve I is that in combination with the closed fluid circuits connecting the various control valves and transmission clutch and brakes with the reservoir, it acts to compensate for loss of pressure due to leakage in the high range clutch under conditions of high engine torque. In this respect, it will be seen that if a leak should occur in or near the high range clutch, the resulting loss of pressure in lines 542, 534 and 534a will effect the movement of the modulating valve 620 to the left due to the action of the spring 622. As a result under conditions of high engine torque normally developed at low engine speeds, a proportionally lower governor pressure is admitted from conduit 340 and conduit 272 to the regulator valve I, near the left side of the valve land 260d. As a result, the then relatively high throttle limit pressure delivered through conduit 268 and the force of spring 266 tends to move the regulator valve 260 to the left, overcoming the governor pressure which is exerting a force in the opposite direction. As previously explained, movement of the regulator valve to the left causes valve land 260b to cover conduit 274 with the result that the pressure in the gallery 250 is increased.

With particular reference to Figure 7, it will be seen that the manual selector valve U has a cylindrical housing 660 with radially disposed ports 662, 664, 666, 668 670, 672 and 674 along its side. Ports 662 and 666 communicate with the high clutch pressure conduit 534 and a branch conduit 534a connecting therewith, respectively, and port 664 communicates with a high-low shift valve pressure line 484. Ports 668 and 670 connect with the low brake pressure conduit 532 and a branch conduit 532a thereof, and port 672 communicates with the gallery 250 through conduit 676. Port 674 connects with conduit 678 which in turn communicates through branch conduits 678a and 678b with the reverse shuttle valve V and the operative side of piston 679 of the reverse brake F, respectively.

A valve 680 having lands 680a, 680b, 680c, and 680d is mounted for reciprocable movement within the housing 660, and its right hand end is connected to a lever 682 by a pin 684, which in turn may be secured by suitable linkage (not shown) to a conventional manual gear shift lever. By selectively positioning the gear shift lever, the driver may move valve 680 to one of five positions, indicated generally at 686; namely $$\frac{N}{P}$$

designating the "neutral or park" position, "." indicating the normal driving range, "D" for rapid acceleration, "L" for low gear drive, and "R" for reverse.

A series of five detents 688 are formed along the left hand end of valve 680 which corresponds to the five manually selectable positions indicated above. Two spring biased ball elements 690 and 692 are mounted for reciprocable movement at right angles to the longitudinal axis of valve 680, and are adapted to engage one of the five detents 688 thereby holding the valve 680 in one of its five manually selectable positions. The ball elements 690 and 692 are housed within radially disposed cylinder chambers 694 and 696, respectively, which are secured to the side of the housing 660, near its left hand end. The elements 690 and 692 are urged into engagement with the valve detents 688 by springs 698 and 700 retained between the elements and the outer housing end walls 702 and 704, respectively. Fluid pressure from the governor conduit 340 is introduced through branch conduits 340b and 340c to each of the chambers 694 and 696, respectively. Thus, when the vehicle is driven, and the governor pressure is increased accordingly, the ball elements 690 and 692 are held firmly in engagement with the detents 688. The selector valve 680 is thereby held in position and cannot be accidentally moved while driving.

A radial bore 706 near the right end of the selector valve 680 is disposed so that it is aligned with conduit 678 only when the selector valve is placed in the "L" position. The radial bore 706 connects with an axial bore 708, which in turn communicates through suitable means (not shown) with the sump. Conduit 678 communicates with the recessed portion of the right end of valve 680 in the "P," "." and "D" positions of valve U which permits the reverse brake F to be vented to the sump through suitable means (not shown).

The reverse shuttle valve V, shown in Figure 8, includes a cylindrical housing 710 disposed in axial alignment with the longitudinal axis of the modulating valve housing 610, and is separated therefrom by the stop member 624. It will be appreciated that the two housings may be formed separately if desired. Housing 710 has radial ports 712 and 714 formed near its opposite ends which connect with branch conduit 678a from the manual selector valve U, and conduit 716 communicating with the inoperative side of piston 679 of the reverse brake F. A branch conduit 676a connects the gallery pressure conduit 676 with a third radial port 718 formed near the middle of housing 710.

A valve 720 having lands 720a and 720b near its opposite ends is reciprocably mounted within the housing. The valve 720 is urged to the left into engagement with a stop member 624 by a spring 722 retained between the right end of the valve and a fixed spring retaining element 726.

When the manual selector valve U is positioned in any of its five positions except "R" reverse, the selector valve port 674 is closed and, therefore, fluid pressure cannot flow to the left side of the reverse shuttle valve 720 through conduit 678a, as a result spring 722 normally maintains the valve 720 in its left hand positions, and gallery pressure from conduit 676a is permitted to flow between lands 720a and 720b into conduit 716, and thence to the upper (release) side of the reverse brake piston 679. Thus, the reverse brake F is held positively in its inoperative position when any of the forward driving ranges are engaged.

When pressure is admitted to the left end of housing 710 through conduit 678a, valve 720 is moved to the right so that land 720a covers port 718 and land 720b uncovers radial vent port 728 in the housing. Gallery pressure then flows through manual selector valve U to conduits 678 and 678b to the under (operative) side of the reverse brake piston 679, engaging the reverse brake F. The fluid pressure on the upper side of the piston is vented through line 716 and vent port 728.

The operation of the above described automatic control system is similar to that described in the above referred copending McFarland, Lucia and De Lorean application No. 498,404, dated March 31, 1955.

It will be apparent that other forms of the invention may be employed without departing from the spirit of the invention, and it is to be understood that the following claims are not to be considered as limited solely to the details of construction and arrangement of parts illustrated and described in the specification.

What is claimed is:

1. In a transmission control system for a transmission adapted for use with an accelerator controlled engine including a transmission output shaft, hydraulic operated clutch to engage the high range drive, hydraulic operated brake means to engage and disengage the low range drive, a fluid pressure reservoir, conduit means connecting with the reservoir and the high range engaging means and the brake means to disengage the low range drive, fluid conveying means connecting with the reservoir and the brake means to engage the low range drive, and control means responsive to the rotation of the output shaft and to the movement of the accelerator pedal towards its speed increasing position for opening and closing the conduit means and the fluid conveying means, a regulating system comprising a regulator valve connecting with the conduit means for momentarily retarding the fluid pressure flow to the high range clutch means when the conduit means is opened by said control means, means connecting with the conduit means for retarding the fluid pressure flow to the low range disengaging brake means when the conduit means is opened by said control means, and valve means connecting with the conduit means on opposite sides of said retarding means which is operatively responsive to the movement of the accelerator pedal for bypassing the retarding means when the accelerator pedal is moved a predetermined distance towards its maximum speed increasing position.

2. A regulating system as described in claim 1 wherein said regulating valve is adapted to rapidly vent fluid pressure delivered to the high range engaging means when the brake means engages the low range drive.

3. A system as described in claim 1 wherein said valve means includes a second regulator valve connecting with the conduit means on opposite sides of the pressure flow retarding means, said second regulator valve being movable in one direction to admit fluid pressure to the low range disengaging brake means and thereby bypassing the retarding means, and said second regulator valve being closed when moved in the opposite direction, spring means to move said regulator valve in said opposite direction and a control valve connecting with the reservoir which is operatively responsive to the movement of the accelerator pedal for delivering fluid pressure substantially proportional to the speed increasing position of the accelerator pedal to said second regulator valve to move the latter in said one direction.

4. In a transmission control system for a transmission adapted for use with an accelerator pedal controlled engine including a transmission output shaft, hydraulic operated means to engage the high range drive, hydraulic operated brake means to engage and disengage the low range drive, a fluid pressure reservoir, conduit means connecting with the reservoir and the high range clutch means, fluid conveying means connecting with the reservoir and the brake means to engage the low range drive, and control means responsive to the rotation of the output shaft and to the movement of the accelerator pedal towards its speed increasing position for opening and closing the conduit means and the fluid conveying means, a regulating system comprising a regulator valve connecting with the conduit means for admitting an increasing, then steady and thereafter an increasing fluid pressure flow to the high range engaging means when said conduit means is opened by said control means; a branch conduit connecting with the conduit means between the regulator valve and the reservoir, and with the brake means to disengage the low range drive; means connecting with the branch conduit for retarding the fluid pressure flow to the low range disengaging means, a valve connecting with the branch conduit on opposite sides of the pressure flow retarding means which is opened when moved in one direction and closed when moved in the opposite direction, spring means to move the valve in said opposite direction and a control valve connecting with the reservoir which is operatively responsive to the movement of the accelerator pedal for delivering fluid pressure substantially proportional to the speed increasing position of the accelerator pedal to said valve to move the latter in said one direction.

5. A system as described in claim 4 including a limit valve connected in series between the control valve and said valve to limit the pressure delivered to the latter by a predetermined value, and wherein the force of said spring means is such that the pressure delivered by said control valve will move said valve in said one direction when the pressure exceeds approximately 10% of its maximum value.

6. A regulating system as described in claim 4 wherein the regulator valve is adapted to rapidly vent fluid pressure delivered to the high range clutch means when the low range brake is engaged.

7. In a control system for a transmission adapted for use with an accelerator pedal controlled engine, including low and high driving ranges, hydraulic clutch means to engage the high range drive, a fluid pressure reservoir, conduit means connecting the reservoir and clutch means and control means to admit fluid pressure from said reservoir to said conduit means, a regulator valve comprising a valve housing having closed ends and inlet and outlet ports near one end thereof connecting in series with said conduit means, and a return port disposed between said outlet port and said one end of the housing, a valve member reciprocably mounted within said housing near said one end thereof, said valve member being adapted to deliver full pressure flow to the outlet port when moved in one direction and to deliver a reduced pressure flow to the outlet port when moved in the opposite direction, a fluid conveying means connecting the outlet port and the return port to deliver fluid pressure therethrough to move said valve member in said opposite direction, a piston means reciprocably mounted within the housing near its opposite end, resilient means to urge said piston means into engagement with said valve member, thereby moving the valve member in said one direction, branch conduit means connecting with said conduit means and said housing to deliver fluid pressure therethrough to move said piston toward said opposite end of the housing and to move said valve member in one direction, and means connecting with said branch conduit to retard the fluid pressure flow to the housing, whereby, when pressure is admitted to said conduit means by said control means, said resilient means first acts to move said valve member in said one direction, and thereafter the branch conduit pressure moves the valve member in said one direction thereby increasing the fluid pressure flow through the outlet port of the regulator valve.

8. In a control system for a transmission adapted for use with an accelerator pedal controlled engine, including low and high driving ranges, hydraulic clutch means to engage the high range drive, a fluid pressure reservoir, conduit means connecting the reservoir and clutch means, and control means to admit fluid pressure from the reservoir to the conduit means, a regulator valve comprising a valve housing having closed ends and inlet and outlet ports near one end thereof connecting in series with said conduit means, and a return port disposed between said outlet port and said one end of the housing, a valve member reciprocably mounted within said housing near said one end thereof, said valve member having one land formed near an end thereof nearest said one end of the housing, and another land formed about its opposite end; said valve member lands being disposed so that when said valve member is moved toward said one end of the housing full pressure flows between the lands to the outlet port, and when said valve member is moved toward the opposite end of the housing said one land partially covers the outlet port to reduce the pressure flow therethrough, fluid conveying means connecting the outlet port and the return port to deliver fluid pressure to move said valve member toward the opposite end of the housing, a piston member reciprocable within the housing near its opposite end, spring means to urge said piston member into engagement with said valve member to move said valve member toward said one end of the housing, an inlet port in said housing communicating with the interior thereof between said valve member and said piston member, a branch conduit connecting said conduit means and said last mentioned inlet port to deliver fluid pressure to move said piston member toward the opposite end of the housing and to move said valve member toward said one end of the housing, and means connecting with said branch conduit to retard the fluid pressure flow therethrough to said last mentioned inlet port, whereby, when pressure is admitted to said conduit means by said control means, said resilient means first acts to move said valve member toward said one end of the housing, and thereafter the branch conduit pressure exerts a greater force to move the valve member toward said one end of the housing, thereby increasing the fluid pressure flow through the outlet port of the regulator valve.

9. A regulator valve as described in claim 8 wherein said valve member has an axial bore extending partially therethrough from its end nearest said one end of the housing, a radial bore near the middle of said valve member communicating with said axial bore, a vent port communicating with the interior of the housing near the middle thereof, said radial bore being moved into alignment with said vent port when said valve member is moved its maximum distance towards said opposite end of the housing, whereby fluid pressure from the high range clutch means delivered through the return port may flow through the vent port when the outlet port pressure exceeds a predetermined value and when no pressure is admitted to the conduit means by said control means.

10. A regulator valve as described in claim 9 wherein the fluid pressure delivered to the return port by said fluid conveying means first reacts against a side of said one land to move the valve member slowly toward the opposite end of the housing, and thereafter the return port pressure reacts against said end of the valve member nearest said one land and said one end of the housing, a substantially greater force acts to move the valve member toward the opposite end of the housing.

No references cited.